(12) United States Patent
Sato et al.

(10) Patent No.: US 6,640,540 B2
(45) Date of Patent: Nov. 4, 2003

(54) ADSORBENT STATE DETERMINING APPARATUS

(75) Inventors: Masahiro Sato, Saitama-ken (JP); Yoshihisa Iwaki, Saitama-ken (JP); Masaki Ueno, Saitama-ken (JP); Shusuke Akazaki, Saitama-ken (JP); Yuji Yasui, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/978,020

(22) Filed: Oct. 17, 2001

(65) Prior Publication Data

US 2002/0053203 A1 May 9, 2002

(30) Foreign Application Priority Data

Nov. 8, 2000 (JP) .......................... 2000-340274

(51) Int. Cl.[7] ................................................ F01N 3/00
(52) U.S. Cl. .............................. 60/297; 60/277; 60/295
(58) Field of Search ........................... 60/277, 295, 297

(56) References Cited

U.S. PATENT DOCUMENTS 6,012,284 A * 1/2000 Tanaka et al. ................. 60/284
6,145,302 A * 11/2000 Zhang et al. .................. 60/274
6,357,225 B1 * 3/2002 Tanaka ........................ 60/277
6,367,245 B1 * 4/2002 Yasui et al. .................. 60/276
6,401,451 B1 * 6/2002 Yasui et al. .................. 60/274

* cited by examiner

Primary Examiner—Thomas Denion
Assistant Examiner—Diem Tran
(74) Attorney, Agent, or Firm—Arent Fox Kintner Plotkin & Kahn (57) ABSTRACT

An adsorbent state determining apparatus is provided for accurately determining the state of an adsorbent including a deterioration as well as for allowing for recovery of the adsorbent if its adsorbent performance can be restored. The adsorbent state determining apparatus determines the state of an adsorbent for adsorbing hydrocarbons contained in exhaust gases. An upstream and a downstream temperature sensor are provided at upstream and downstream locations of the adsorbent in an exhaust system for detecting temperatures of exhaust gases upstream and downstream of the adsorbent. An engine water temperature sensor detects an operating state of the engine. An ECU estimates the temperature of the exhaust gas which should be detected downstream of the adsorbent during adsorption of the adsorbent based on the upstream temperature detected by the upstream temperature sensor and an engine water temperature of the engine detected by the engine water temperature sensor. The ECU then compares the estimated downstream temperature with the detected downstream temperature detected by the downstream temperature sensor during adsorption of the adsorbent to determine the adsorption state of the adsorbent.

7 Claims, 10 Drawing Sheets

ADSORBENT STATE DETERMINING APPARATUS

BACKGROUND OF THE INVENTION

1. Field of the Invention

The present invention relates to an adsorbent state determining apparatus for determining the state of an adsorbent arranged in an exhaust system of an internal combustion engine for adsorbing hydrocarbons in exhaust gases.

2. Description of the Prior Art

A conventional adsorbent state determining apparatus of the type mentioned above is known, for example, in Laid-open Japanese Patent Application No. 11-2115. This known determining apparatus is provided for determining a deterioration of an adsorbent. The determining apparatus is provided with temperature sensors at locations upstream and downstream of an adsorbent, respectively, for sensing internal temperatures at those locations, and compares times at which the two temperature sensors generate peak detected values when the adsorbent is in an adsorbing condition, or times at which time differentiated detected values of the two sensors reach peaks to determine the deterioration of the adsorbent. The determining approach as mentioned relies on the nature of the adsorbent. Specifically, the peak of the internal temperature of the adsorbent or the rising rate thereof occurs in the adsorbing condition, and the peak occurs earlier at an upstream location than at a downstream location. Also, as the adsorbent deteriorates, the peak occurs earlier at the downstream location. Thus, the determining approach can determine whether or not the adsorbent is deteriorated based on a comparison of the times at which the two temperature sensors present peaks, rather than temperature values detected thereby, without employing highly accurate temperature sensors.

However, the time at which the peak of the internal temperature or its rising rate of the adsorbent is reached during adsorption is not determined only by the state of the adsorbent, but varies in accordance with an operating state of an engine, just like the arrival time of exhaust gases which differs depending on the operating state of the engine, by way of example. In contrast, the prior art determining apparatus simply compares times at which the two temperature sensors present peaks of temperature values detected thereby or their time-differentiated values, irrespective of the operating condition of the engine, thereby failing to accurately determine the deterioration of the adsorbent.

In addition, since a temperature sensor has more or less a response delay, the response delay directly affects a time at which detected value reaches the peak, if the responsibility is low, possibly causing a further reduction in the accuracy of determining a deterioration. Furthermore, the adsorption performance of the adsorbent may be degraded by a variety of causes which include those resulting from attachment of soot, oil and the like on the adsorbent, and those resulting from a deterioration of the adsorbent itself. While the adsorption performance can be restored from the degradation resulting from the former causes, it cannot be restored from the degradation resulting from the latter causes. However, since the conventional determining apparatus senses the degraded adsorption performance based on the peak occurrence times irrespective of the cause, the adsorbent is likely to be determined as deteriorated even if its adsorption performance can be restored, in which case the opportunities for the adsorbent to demonstrate its performance are unduly narrowed so that the adsorbent fails to manifest its purifying action.

OBJECT AND SUMMARY OF THE INVENTION

The present invention has been made to solve the problem mentioned above, and it is an object of the invention to provide an adsorbent state determining apparatus which is capable of accurately determining the state of an adsorbent including a deterioration as well as allowing for the recovery of the adsorbent if its adsorbent performance can be restored.

To achieve the above object, the present invention provides an adsorbent state determining apparatus for determining a state of an adsorbent arranged in an exhaust system of an internal combustion engine for adsorbing hydrocarbons within exhaust gases, characterized by comprising an upstream temperature sensor and a downstream temperature sensor positioned at locations upstream and downstream of the adsorbent in the exhaust system for detecting temperatures of exhaust gases upstream and downstream of the adsorbent, respectively; operating state detecting means for detecting an operating state of the internal combustion engine; downstream temperature estimating means for estimating the temperature of exhaust gases which should be detected at the location downstream of the adsorbent during adsorption of the adsorbent based on a detected upstream temperature detected by the upstream temperature sensor and the operating state of the internal combustion engine detected by the operating state detecting means; and adsorption state determining means for determining an adsorption state of the adsorbent by comparing the estimated downstream temperature estimated by the downstream temperature estimating means with the detected downstream temperature detected by the downstream temperature sensor during adsorption of the adsorbent.

According to this state determining apparatus, the temperatures of exhaust gases upstream and downstream of the adsorbent are detected by the upstream temperature sensor and the downstream temperature sensor, respectively. Also, the temperature of exhaust gases which should be detected downstream of the adsorbent during adsorption of the adsorbent is estimated based on the detected upstream temperature detected by the upstream temperature sensor, and the operating state of the internal combustion engine. Then, the adsorption state of the adsorbent is determined by comparing the estimated downstream temperature with the actually detected downstream temperature detected by the downstream temperature sensor during the adsorption of the adsorbent.

As the internal combustion engine is cold started, the heat of exhaust gases is absorbed by the cold adsorbent, when it passes therethrough, so that the downstream temperature during the adsorption rises with a delay in accordance with the adsorption performance of the adsorbent and a particular operating state of the internal combustion engine with respect to the upstream temperature. Also, as the adsorption performance of the adsorbent is degraded, the adsorbent can absorb a less amount of heat, causing the downstream temperature to rise earlier. It is therefore possible to appropriately determine an adsorption state of the adsorbent including the adsorption performance, while reflecting the operating state of the internal combustion engine, by calculating an estimated downstream temperature which should be detected on the downstream side when the adsorbent is normal in accordance with a detected upstream temperature and the operating state of the internal combustion engine, and comparing the estimated downstream temperature with the actually detected downstream temperature during the adsorption.

Preferably, the adsorption state determining apparatus further comprises response delay compensating means for compensating at least one of the upstream temperature sensor and the downstream temperature sensor for a response delay.

According to this preferred embodiment, the response delay compensating means compensates the upstream temperature sensor and/or the downstream temperature sensor for a response delay, thereby making it possible to maintain the accuracy for determining the adsorption state of the adsorbent even if actually used temperature sensors have a low responsibility.

Preferably, in the adsorption state determining apparatus, the adsorbent is configured to desorb hydrocarbons once adsorbed thereby, wherein the adsorption state determining apparatus further comprises desorption state determining means for determining a desorption state of the adsorbent; and desorption state storing means for storing the desorption state of the adsorbent determined by the desorption state determining means, wherein the adsorption state determining means determines adsorption performance of the adsorbent in accordance with the desorption state stored in the desorption state storing means in a preceding operation of the internal combustion engine.

According to this preferred embodiment, the desorption state determining means can determine a desorption state of the adsorbent. The adsorption state determining means in turn determines the adsorption performance of the adsorbent in accordance with the desorption state in the preceding operation of the engine. It is therefore possible to avoid determining the adsorption performance of the adsorbent with hydrocarbons and the like remaining on the adsorbent, for example, because of uncompleted desorption in the preceding operation, and erroneous determination on the adsorption performance which would be otherwise made in such a situation.

Preferably, in the adsorbent state determining apparatus, the exhaust system includes a main passage, a bypass passage circumventing the main passage and having the adsorbent arranged therein, and switching means for switching an exhaust passage to the main passage and to the bypass passage, wherein the exhaust passage is switched to the bypass passage by the switching means at a start of the internal combustion engine to adsorb hydrocarbons within exhaust gases on the adsorbent, and subsequently the exhaust passage is switched to the main passage by the switching means to desorb the hydrocarbons adsorbed on the adsorbent by exhaust gases.

According to this preferred embodiment, after the internal combustion engine is started, the exhaust passage is switched to the bypass passage to adsorb hydrocarbons contained in exhaust gases on the adsorbent. Then, with the exhaust passage switched to the main passage, adsorbed hydrocarbons are desorbed from the adsorbent by exhaust gases. This preferred embodiment also provides the advantageous effect described above.

Preferably, the adsorbent state determining apparatus further comprises exhaust gas flow rate parameter detecting means for detecting a parameter representative of a flow rate of exhaust gases, wherein the desorption state determining means determines termination of desorption of hydrocarbons from the adsorbent in accordance with the exhaust gas flow rate parameter detected by the exhaust gas flow rate parameter detecting means during desorption of the adsorbent.

According to this preferred embodiment, the completion of desorption of hydrocarbons from the adsorbent is determined in accordance with the exhaust gas flow rate parameter detected during the desorption. Since the desorption of the adsorbent is performed by exhaust gases, the degree of desorption and the flow rate of exhaust gas during the desorption are in a mutually close relationship, and have a high correlation to each other. It is therefore possible to simply and appropriately determine the completed desorption of the adsorbent in accordance with the exhaust gas flow rate parameter during the desorption.

Preferably, the adsorbent state determining apparatus further comprises recovery control means for conducting a recovery control for restoring the adsorption performance of the adsorbent when the adsorption state determining means determines that the adsorption performance of the adsorbent has been degraded and when the desorption state determining means determines that the adsorbent has completed desorption.

According to this preferred embodiment, the recovery control is conducted for restoring the adsorption performance of the adsorbent when it is determined that the adsorption performance of the adsorbent has been degraded, so that the adsorbent can be recovered by the recovery control when the degraded adsorption performance is caused by attachment of sooth, oil and the like on the adsorbent and hence can be restored. Also, since the recovery control is conducted only when the adsorbent has completed the desorption, it can be ensured to avoid the emission of adsorbed hydrocarbons to the atmosphere by the recovery control before desorption or during desorption.

Preferably, in the adsorbent state determining apparatus, the adsorption state determining means again determines the adsorption performance of the adsorbent after the recovery control has been conducted to determine a deterioration of the adsorbent in accordance with the result of determination.

According to this preferred embodiment, the adsorption performance of the adsorbent is again determined after the recovery control has been conducted to determine a deterioration of the adsorbent in accordance with the result of determination. Thus, a deteriorated adsorbent is determined as definite only when the adsorption performance cannot be restored by the recovery control, thereby making it possible to appropriately determine a deteriorated adsorbent in accordance with the cause by which the adsorption performance is degraded.

DETAILED DESCRIPTION OF THE EMBODIMENT

Figure 1:
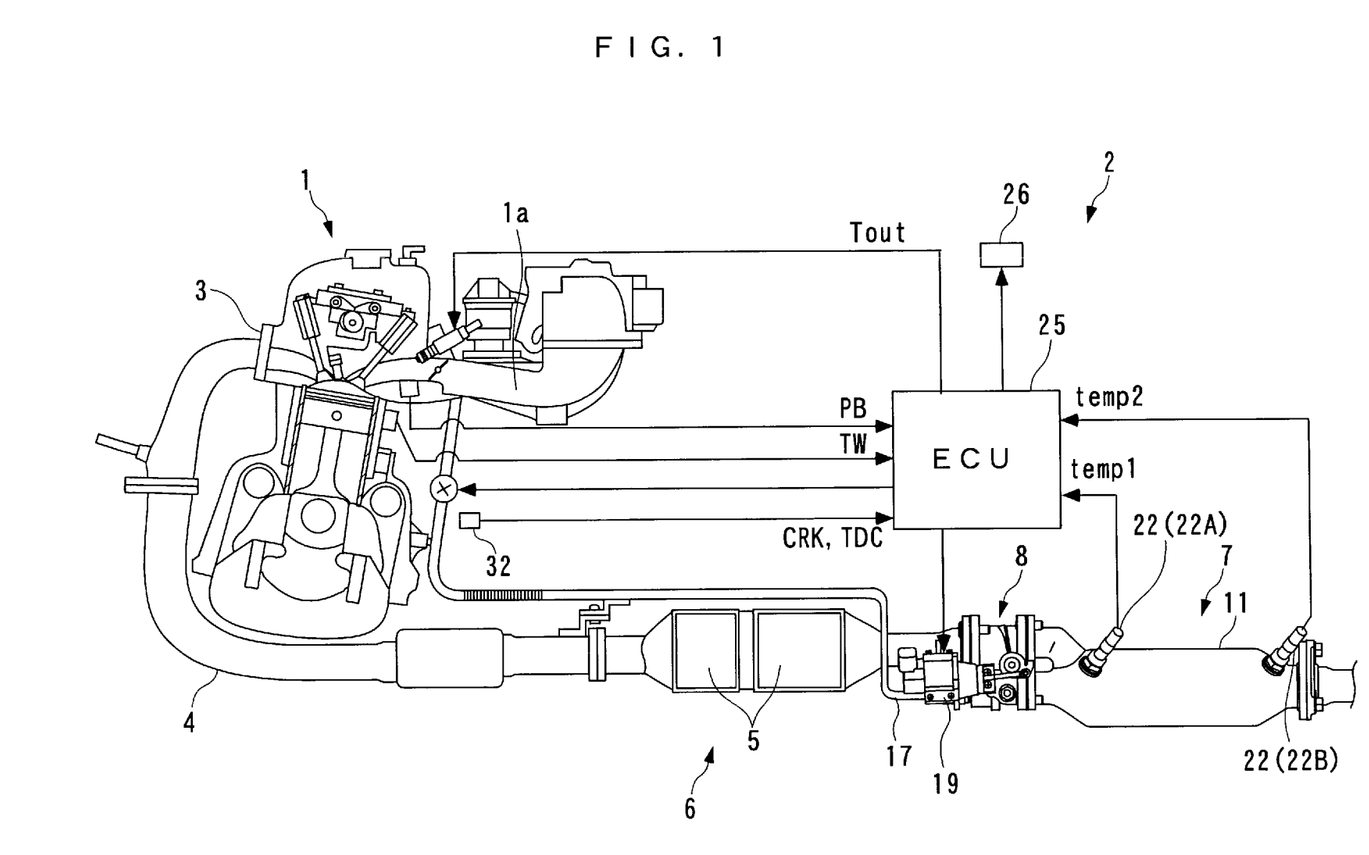
FIG. 1 is a diagram illustrating the configuration of an internal combustion engine to which an HC adsorbent state determination apparatus according to one embodiment of the present invention is applied.

In the following, a preferred embodiment of the present invention will be described in detail with reference to the accompanying drawings. FIG. 1 illustrates an internal combustion engine in which the embodiment of the present invention is applied. In the illustrated internal combustion engine (hereinafter simply referred to the "engine") 1, an exhaust system 2 has an exhaust pipe 4 connected to the engine 1 through an exhaust manifold 3. A catalyzer 6 having two three-way catalysts 5, and a hydrocarbon adsorber 7 for adsorbing hydrocarbons are provided at intermediate locations in the exhaust pipe 4 for purifying exhaust gases. The two three-way catalysts 5 of the catalyzer 6 are arranged adjacent to each other along the exhaust pipe 4. The three-way catalysts 5, when activated at or above a predetermined temperature (for example, 300° C.), purify harmful substances (hydrocarbons, carbon monoxide and nitrogen compounds) in exhaust gases passing through the catalyzer 6 by oxidation-reduction catalyst actions.

Figure 2:
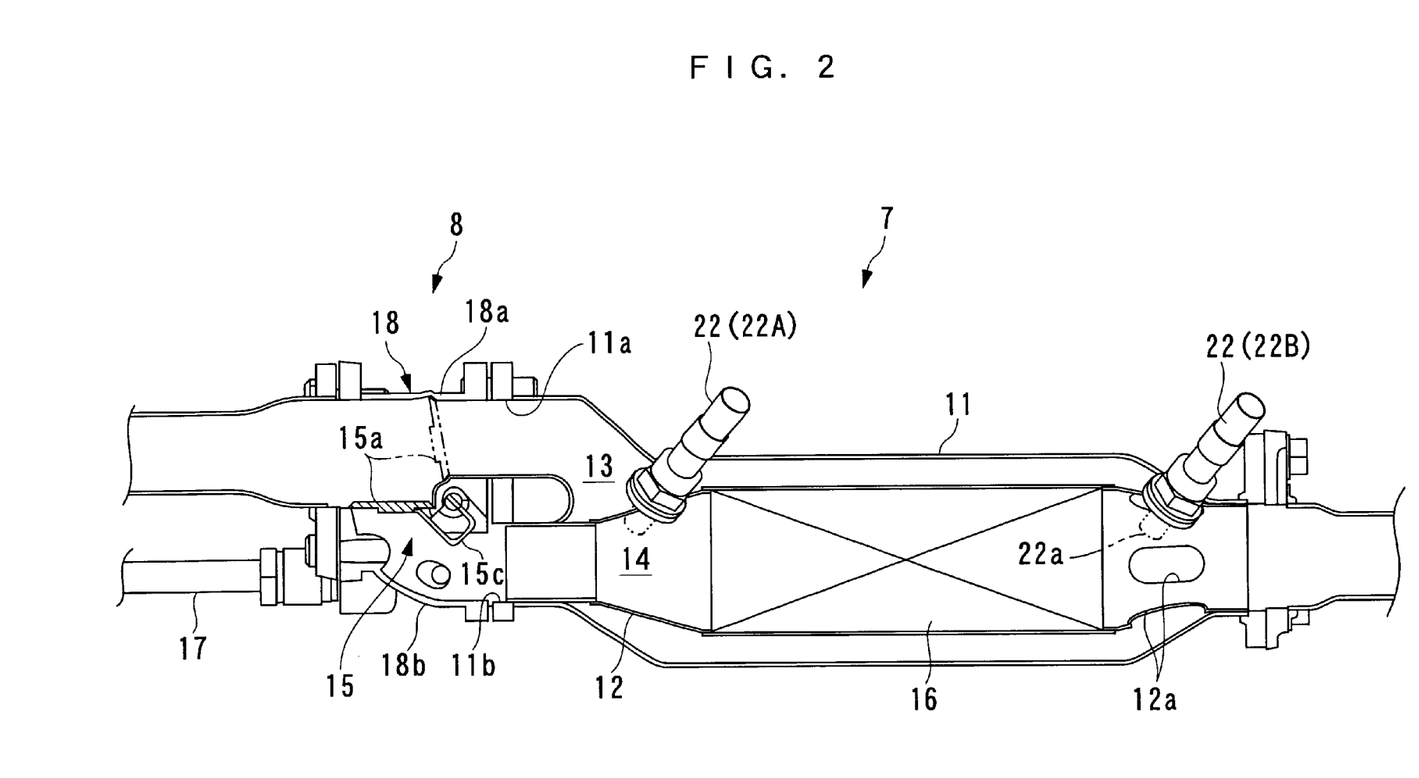
FIG. 2 is an enlarged cross-sectional view illustrating a hydrocarbon adsorber.

The hydrocarbon adsorber 7, in turn, is arranged in the exhaust pipe 4 at a location downstream of the catalyzer 6 for adsorbing hydrocarbons in exhaust gases during a starting period (for example, about 30–40 seconds after the start) of the engine 1 in a cold start state in which the three-way catalysts 5 have not been activated, thereby largely reducing the amount of hydrocarbons emitted to the atmosphere. As illustrated in FIGS. 1 and 2, the hydrocarbon adsorber 7 is coupled to a downstream end of the catalyzer 6 through an exhaust passage switch 8. The hydrocarbon adsorbent 7 comprises a case 11 forming a substantially cylindrical shell; a bypass exhaust pipe 12 arranged within the case 11; and a cylindrical HC adsorbent 16 filled in the middle of the bypass exhaust pipe 12 for adsorbing hydrocarbons contained in exhaust gases which flow into the bypass exhaust pipe 12.

As illustrated in FIG. 2, the case 11 has its upstream end branched into two: an upper opening 11a in communication with a main passage 13 having an annular cross-section, formed between the case 11 and the bypass exhaust pipe 12, and a lower opening 11b in communication with a bypass passage 14 which defines an internal space of the bypass exhaust pipe 12.

The bypass exhaust pipe 12 has its upstream end hermetically connected to the inner wall of the lower opening 11b of the case 11, and its downstream end likewise hermetically connected to the inner wall of a downstream end of the case 11. The bypass exhaust pipe 12 is formed with a plurality (for example, five) of elongated communication holes 12a formed in a downstream end portion at equal intervals from one another in the circumferential direction. The main passage 13 and the bypass passage 14 have their downstream ends communicating through these communication holes 12a.

The HC adsorbent 16 is comprised of a honeycomb core (not shown), made of a metal, which carries zeolite on its surface, so that as exhaust gases flowing into the bypass passage 14 pass through the interior of the HC adsorbent 16, hydrocarbons contained in the exhaust gases are adsorbed by zeolite. Zeolite, which has high heat resistant properties, adsorbs hydrocarbons in a low temperature state (for example, below 100° C.), and desorbs hydrocarbons once adsorbed thereby when its temperature rises to a predetermined temperature or higher (for example, 100–250° C.). It should be noted that the zeolite is only required to have the ability of adsorbing hydrocarbons and is not particularly limited in the type. This embodiment employs a mixture of USY (Y-type), Ga-MFI and ferrierite.

The exhaust passage switch 8 (switching means) is provided for coupling the hydrocarbon adsorber 7 in the foregoing configuration to the catalyzer 6, and for selectively switching the passage of exhaust gases downstream of the catalyzer 6 to the main passage 13 and to the bypass passage 14 in accordance with the activated state of the three-way catalysts 5. The exhaust passage switch 8 has a substantially cylindrical connecting pipe 18; and a switching valve 15 arranged within the connecting pipe 18 for switching the exhaust passage. The connecting pipe 18 is comprised of a main pipe section 18a for hermetically communicating the downstream end of the catalyzer 6 with the main passage 13 of the hydrocarbon adsorber 7; and a branch pipe section 18b branched off an upstream portion of the main pipe section 18a for hermetically communicating the downstream end of the catalyzer 6 with the bypass passage 14.

The switching valve 15 in turn has a discoidal valve body 15a, and an arm 15c in a predetermined shape for supporting the valve body 15a at one end thereof. As the arm 15c is driven to rotate over a predetermined angle about the other end by a switching valve driving unit 19 (see FIG. 1) under control of an ECU 25, later described, the valve body 15a pivotally moves to open one of the main pipe section 18a and the branch pipe section 18b and to close the other one. Specifically, when the valve body 15a opens the main pipe section 18a and closes the branch pipe section 18b as indicated by solid lines in FIG. 2, the exhaust passage is switched to the main passage 13. On the contrary, when the valve body 15a stays at a position indicated by a two-dot chain line, the exhaust passage is switched to the bypass passage 14. The arm 15c is provided with a twisted coil spring, not shown, at the other end thereof, so that the exhaust passage is normally biased to the main passage 13 by the twisted coil spring.

An EGR passage 17 is connected between the branch pipe section 18b of the connecting pipe 18 and an intake pipe 1a of the engine 1 for recirculating a portion of exhaust gases to the engine 1, with an EGR control valve 20 attached at an intermediate location thereof. The EGR control valve 20, which may be comprised of an electromagnetic valve, is arranged at a location of the EGR passage 17 near the engine 1 for opening and closing the EGR passage 17 and changing the opening of the EGR passage 17, under control of the ECU 25, to actuate/stop the EGR and control the amount of EGR.

According to the foregoing configuration, the exhaust passage is switched to the bypass passage 14 by the exhaust passage switch 8 immediately after a cold start of the engine 1, thereby introducing exhaust gasses passing through the catalyzer 6 into the bypass passage 14. After hydrocarbons contained in the exhaust gases have been adsorbed by the HC adsorbent 16, the exhaust gases are emitted to the atmosphere. Subsequently, upon determining that hydrocarbons have been fully adsorbed by the HC adsorbent 16, the exhaust passage is switched to the main passage 13, thereby introducing the exhaust gases into the main passage 13 through the main pipe section 18a of the connecting tube 18 to emit the exhaust gases to the atmosphere. Also, as the EGR control valve 20 is opened to operate the EGR, a portion of the exhaust gases is recirculated to the intake pipe 1a through the branch pipe section 18b and the EGR passage 17 as an EGR gas. Hydrocarbons desorbed from the HC adsorbent 16 are sent to the intake pipe 1a by the EGR gas and burnt by the engine 1.

The case 11 of the hydrocarbon adsorber 7 is also provided with an upstream temperature sensor 22A and a downstream temperature sensor 22B (hereinafter called the "temperature sensors 22" when collectively treated) attached at locations upstream and downstream of the HC adsorbent 16, respectively. The upstream and downstream temperature sensors 22A, 22B may be comprised of thermistors or the like for detecting exhaust gas temperatures temp1, temp2 on the upstream side and the downstream side of the HC adsorbent 16 within the bypass passage 14 (hereinafter called the "upstream temperature" and the "downstream temperature," respectively) to output signals indicative of detected temperatures to the ECU 25.

The ECU 25 is also supplied with a signal indicative of an engine water temperature TW from an engine water temperature sensor 23; a signal indicative of an intake pipe inner pressure PB from an intake pipe inner pressure sensor 24; and a CRK signal and a TDC signal, which are pulse signals, from a crank angle sensor 32, respectively. The CRK signal is generated every predetermined crank angle as a crank shaft, not shown, of the engine 1 is rotated, while the TDC signal is generated, for example, each time the crank shaft is rotated over 180 degrees. The ECU 25 calculates a rotational speed NE of the engine 1 based on the CRK signal. Further, also connected to the ECU 25 is an alarm lamp 26 which is turned on upon determination of, for example, a deterioration of the HC adsorbent 16.

In this embodiment, the ECU 25 comprises downstream temperature estimating means, adsorption state determining means, response delay compensating means, desorption state determining means, desorption state storing means, exhaust gas flow rate parameter detecting means, and recovery control means. The ECU 25 may be implemented by a microcomputer which is comprised of an I/O interface, a CPU, a RAM including a backup RAM, a ROM, and the like. Signals detected by the aforementioned sensors such as the temperature sensors 22 are inputted to the CPU after subjected to A/D conversion, waveform reshaping and the like in the I/O interface. The CPU controls a fuel injection time Tout for an injector 2a of the engine 1, and the EGR control valve 20, as well as executes state determination processing for the HC adsorbent 16, as described below, in response to these detection signals and in accordance with a control program and the like stored in the ROM.

Figure 3:
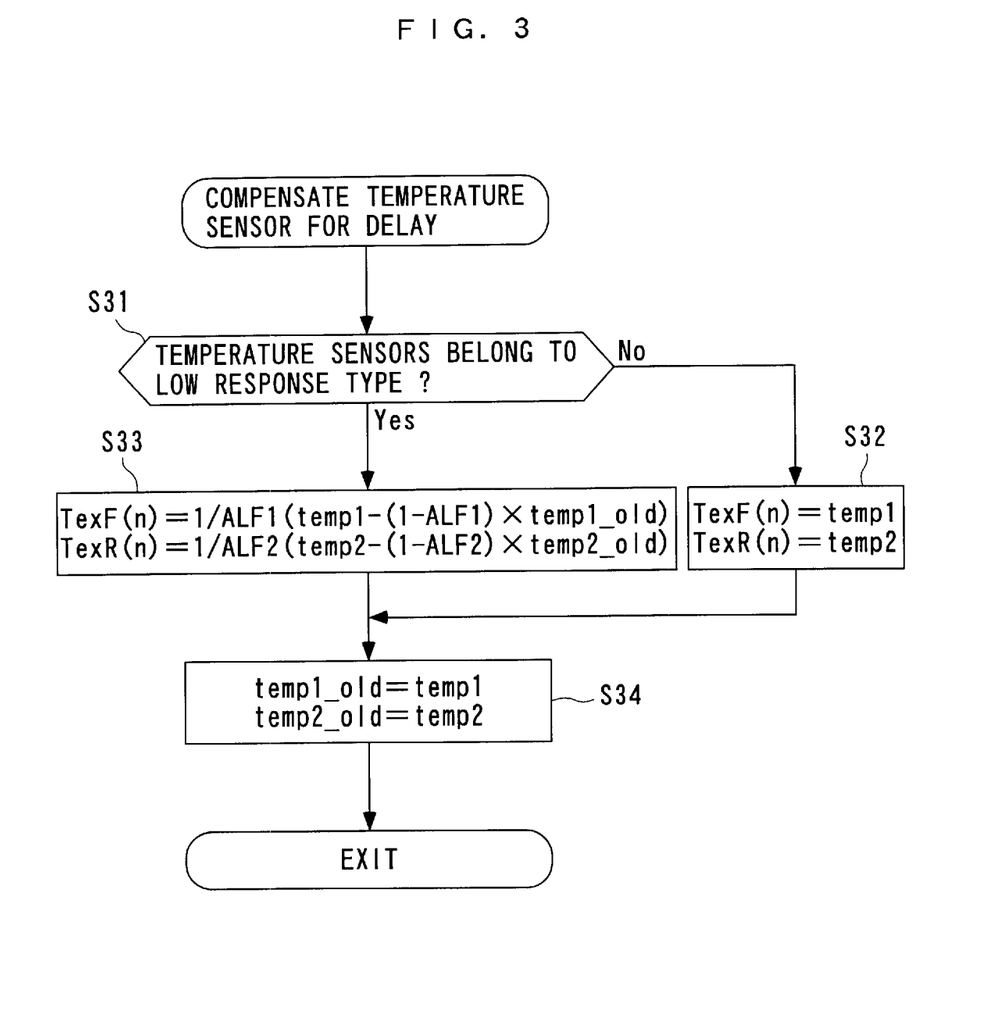
FIG. 3 is a flow chart illustrating a routine for compensating temperature sensors for a response delay.

Next, the state determination processing for the HC adsorbent 16 will be described with reference to FIGS. 3 through 10. FIG. 3 illustrates a routine for compensating for a response delay of the temperature sensors 22. As described later, since this embodiment senses the adsorption performance of the HC adsorbent 16 based on the relationship between the results detected by the upstream and downstream temperature sensors 22A, 22B, the compensation processing is executed in order to more accurately sense the adsorption performance.

In this processing, it is first determined at step 31 (labeled as "S31" in the figure. The same is applied to the following description) whether or not the used temperature sensors 22A, 22B belong to a low response type. If the answer is No, indicating that the sensors 22A, 22B do not belong to the low response type, temperature values temp1, temp2 detected by the upstream and downstream temperature sensors 22A, 22B are set as they are as a current upstream temperature TexF(n) and downstream temperature TTexR(n) (step 32).

On the other hand, if the answer at step 31 is Yes, indicating that the temperature sensors 22A, 22B belongs to the low response type, the current upstream temperature TexF(n) and downstream temperature TexR(n) are calculated by the following equations (1), (2) using the currently detected temperature values temp1, temp2 and the preceding detected temperature values temp1_old, temp2_old (step 33). Next, the currently detected temperature values temp1, temp2 are shifted to the preceding values temp1_old, temp2_old, respectively, (step 34), followed by termination of the program.

$$Tex\_F(n)=(temp1-(1-ALF1)\times temp1\_old)/ALF1 \qquad (1)$$

$$Tex\_R(n)=(temp2-(1-ALF2)\times temp2\_old)/ALF2 \qquad (2)$$

where ALF1, ALF2 are correction coefficients found by experiments conforming to the specifications of the respective temperature sensors 22A, 22B, and may take values in a range of 0<ALF1<1.0 and 0<ALF2<1.0, respectively. Also, as can be appreciated from the fact that the equation (1), for example, may be rewritten into the following equation (1)', the degree of compensation becomes larger as the correction coefficients ALF1, ALF2 are smaller, while the degree of compensation becomes smaller as the correction coefficients ALF1, ALF2 are larger, and the upstream temperature TexF(n) and downstream temperature TexR(n) infinitely approach the currently detected values temp1, temp2, as the values of ALF1, ALF2 are closer to 1.0.

$$Tex\_F(n)=(temp1-temp1\_old)/ALF1+temp1\_old \qquad (1)'$$

Figure 4A:
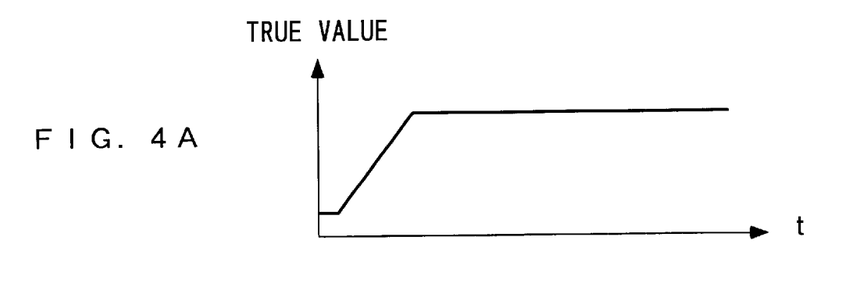
FIGS. 4A–4C are diagrams conceptually illustrating the result of the response delay compensation in FIG. 3.
Figure 4B:
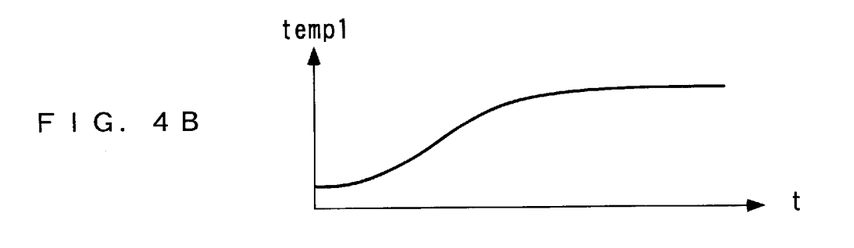
Figure 4C:
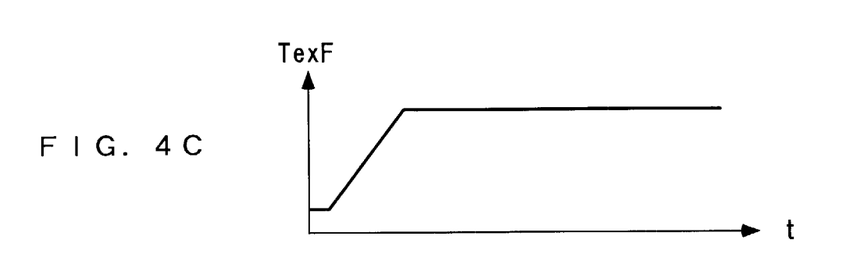

FIGS. 4A–4C illustrate exemplary transitions of the actual temperature (true value) of exhaust gases upstream of the HC adsorbent 16 after the start of the engine 1; the detected upstream temperature temp1 detected by the upstream temperature sensor 22A; and the upstream temperature TexF after the detected upstream temperature temp1 is compensated for as described above. Specifically, as illustrated in FIG. 4A, when the actual temperature of exhaust gases rises after the start of the engine 1 and subsequently remains at a substantially constant level, the detected value temp1 of the upstream temperature sensor 22A follows the true value with a delay as illustrated in FIG. 4B if the temperature sensor 22A has a low responsibility. On the other hand, the upstream temperature TexF is calculated by the equation (1), so that the correction coefficient ALF1, if appropriately set, permits the upstream temperature TexF to follow the true value without delay, thereby making it possible to properly compensate the upstream temperature sensor 22A for the response delay. It should be noted that while the foregoing compensation is made on both upstream and downstream temperature sensors 22A, 22B, the compensation may be made only on one of them.

Figure 5:
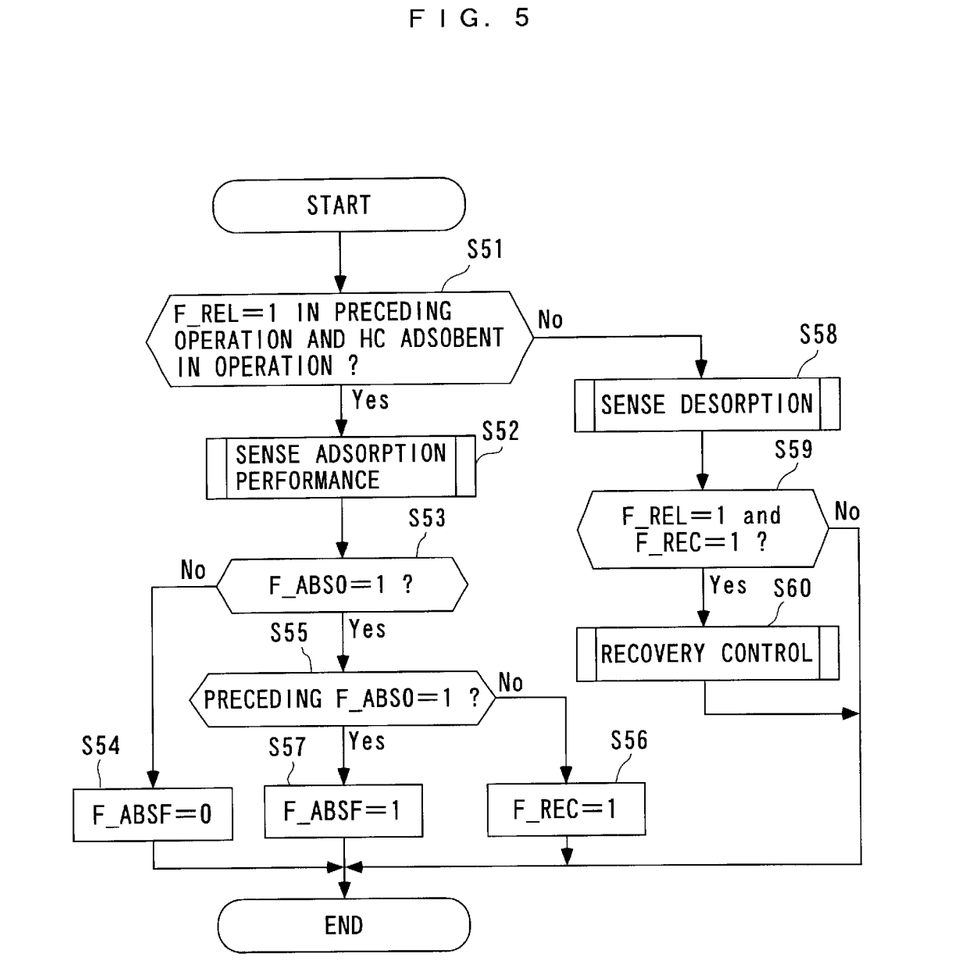
FIG. 5 is a flow chart illustrating a main flow of state determination processing program for an HC adsorbent.

FIG. 5 illustrates a main flow of the state determination processing program for the HC adsorbent 16. In this processing, it is first determined at step 51 whether or not a desorption complete flag F_REL set during the preceding engine operation is "1" and whether or not the HC adsorbent 16 is in operation. The desorption complete flag F_REL is set to "1" when the HC adsorbent 16 has completely desorbed hydrocarbons adsorbed thereon during desorption sensing processing, later described, and is stored in a backup RAM even after the engine 1 is stopped. The determination as to whether or not the HC adsorbent 16 is in operation is made based, for example, on whether or not the switching valve 15 is switched to the bypass passage 14.

If the answer at step 51 is Yes, i.e., when the HC adsorbent 16 has completely desorbed hydrocarbons during the preceding engine operation, with the HC adsorbent 16 currently remaining in operation, the flow proceeds to step 52, where the ECU 25 executes adsorption performance sensing processing for the HC adsorbent 16. In other words, if the HC adsorbent 16 has not completely desorbed hydrocarbons during the preceding engine operation, the ECU 25 does not execute the adsorption performance sensing processing for the HC adsorbent 16. In this way, the execution of the adsorbent performance sensing processing can be avoided when hydrocarbons and the like still remain on the HC adsorbent 16, thereby preventing erroneous sensing of the adsorption performance resulting therefrom.

Figure 6:
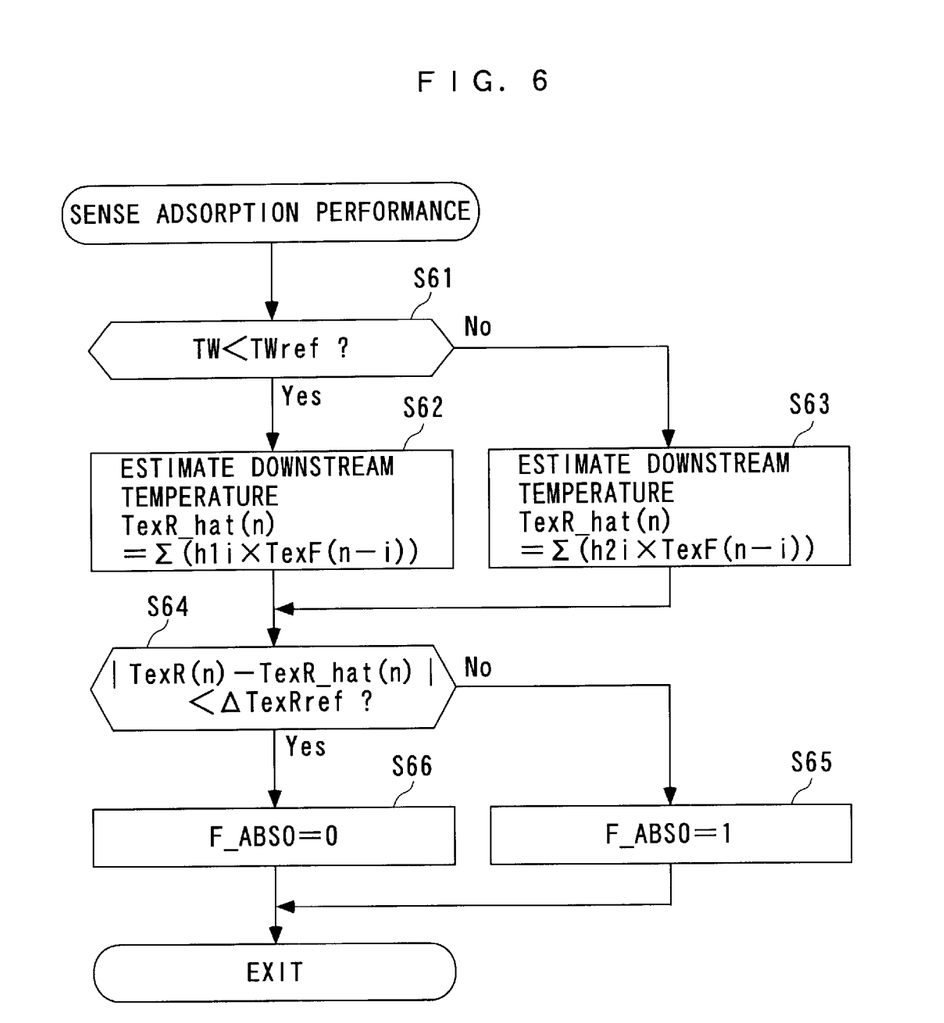
FIG. 6 is a flow chart illustrating a subroutine for adsorption performance sensing processing for the HC adsorbent.

FIG. 6 illustrates a subroutine for the adsorption performance sensing processing. In this processing, it is first determined whether or not an engine water temperature TW detected at the start of the engine 1 is lower than a threshold TWref (for example, 10° C.) (step 61). If the answer at step 61 is Yes, indicating that TW<TWref is established, i.e., the engine temperature at the start is low, an estimated downstream temperature TexR_hat(n) is calculated by the following equation (3) based on the upstream temperature TexF calculated at step 32 or 33 in FIG. 3 (step 62). On the other hand, if the answer at step 61 is No, indicating that TW≧TWref is established, i.e., the engine temperature at the start is high, the estimated downstream temperature TexR_hat(n) is calculated by the following equation (4) (step 63):

$$TexR\_hat(n) = \Sigma(h1i \times TexF(n-i)) \quad (3)$$

$$TexR\_hat(n) = \Sigma(h2i \times TexF(n-i)) \quad (4)$$

where i=0–N (N is a predetermined number (for example, ten)), so that TexF(n−1) represents upstream temperatures TexF calculated at the current time and past N times. h1i, h2i are parameters for estimating a current downstream temperature, which should be derived on the assumption that the HC adsorbent 16 is in a normal state, i.e, its adsorption performance is not degraded, from the upstream temperature TxF(n−i), and are given weights in accordance with i. The parameter h1i for high temperature is set to a larger value than the parameter h2i for low temperature as a whole.

Next, the subroutine proceeds to step 64, where it is determined whether or not an absolute value |TexF(n)−TexR_hat(n)| of the difference between the current downstream temperature TexR(n) calculated at step 32 or 33 in FIG. 3 and the estimated downstream temperature TexR_hat(n) calculated at the aforementioned step 62 or 63 is smaller than a threshold ΔTexRef (for example 25° C.). If the answer at step 64 is No, i.e., there is a large difference between the actual downstream temperature TexF(n) and the estimated downstream temperature TexR_hat(n), it is assumed that the adsorption performance of the HC adsorbent 16 has been degraded, and an adsorption performance degradation flag F_ABS0 is set to "1" for indicating to that effect (step 65). On the other hand, if the answer at step 64 is Yes, it is assumed that the adsorption performance of the HC adsorbent 16 has not been degraded (normal), and the adsorption performance degradation flag F_ABS0 is set to "0"0 (step 66), followed by termination of the subroutine.

Figure 7A:
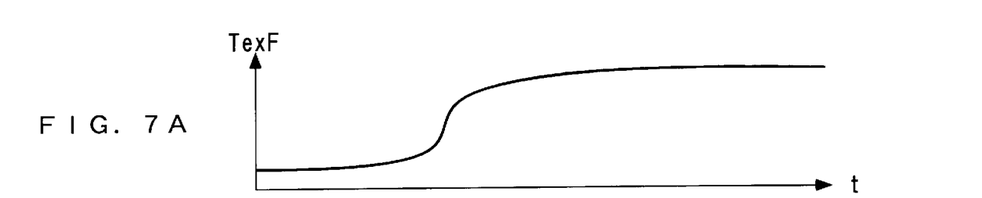
FIGS. 7A–7D are diagrams conceptually illustrating temperature characteristics of the HC adsorbent during adsorption
Figure 7B:
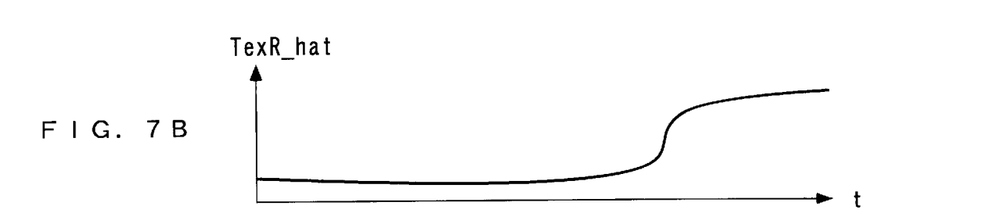

The forgoing adsorption performance sensing processing relies on the temperature characteristics exhibited by the HC adsorbent 16 during its adsorption, as described below. Specifically, when the engine 1 is cold started, the upstream temperature TexF varies, for example, as illustrated in FIG. 7A due to a rise in temperature caused by exhaust gases. Also, since the heat of the exhaust gases is absorbed by the cold HC adsorbent 16 when it passes therethrough, the downstream temperature TexR rises with a delay with respect to the upstream temperature TexF depending on the adsorption performance of the HC adsorbent 16 and a particular operating state of the engine 1. The estimated downstream temperature TexR_hat is an estimate of the downstream temperature, which should be detected when the HC adsorbent 16 is normal, i.e., its adsorption performance is not degraded, using the parameters h1i, h2i based on the upstream temperature TexF (FIG. 7B). As described above, the parameter h1i for high temperature is set to a larger value than the parameter h2i for low temperature because a high engine temperature at the start would result in a smaller amount of heat absorbed by the HC adsorbent 16 and cause the downstream temperature TexR to rise earlier.

Figure 7C:
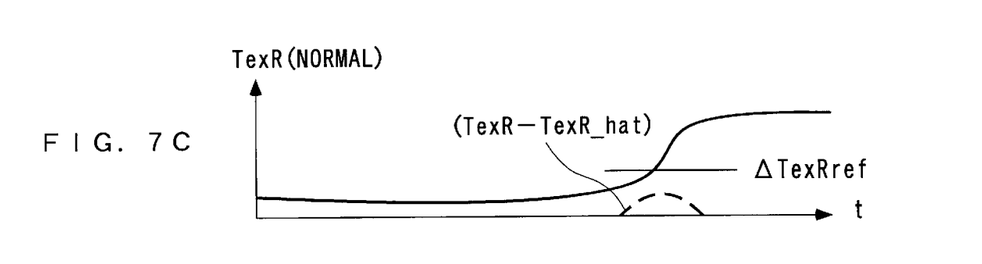
Figure 7D:
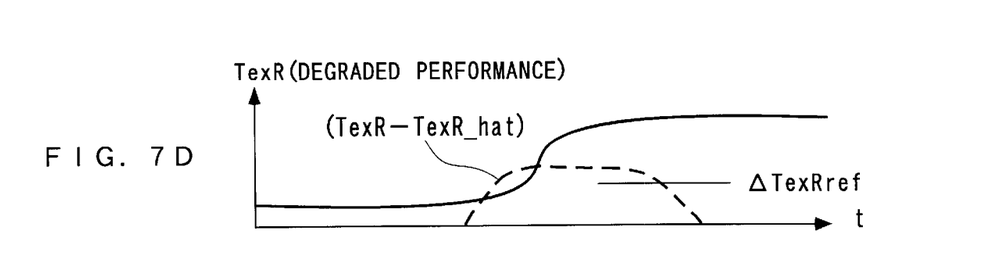

Therefore, if the adsorption performance of the HC adsorbent 16 has not been degraded, the actual downstream temperature TexR(n) presents a value close to the estimated downstream temperature TexR_hat(n), as illustrated in FIG. 8C, so that the difference therebetween, indicated by a broken line, is held at a small value. On the other hand, as the adsorption performance is degraded, the HC adsorbent 16 can absorb a less amount of heat, so that the actual downstream temperature TexF(n) tends to rise earlier than when the HC adsorbent 16 is normal, as illustrated in FIG. 8D, thereby increasing the difference (broken line) between the actual downstream temperature TexF(n) and the estimated downstream temperature TexR(n). It is therefore possible to appropriately determine whether or not the adsorption performance of the HC adsorbent 16 has been degraded by monitoring the difference TexF(n)−TexR_hat(n), and comparing the difference with the threshold ATexRef (step 64 in FIG. 6).

Turning back to FIG. 5, at step 53 following the adsorption performance sensing processing, it is determined whether or not the adsorption performance degradation flag F_ABS0 is "1." If the answer at step 53 is No, i.e., determining in the current adsorption performance sensing processing that the adsorption performance of the HC adsorbent 16 has not been degraded, the HC adsorbent 16 is determined to be normal, without deterioration, and the adsorbent deterioration flag F_ABSF is set to "0" (step 54) for indicating to that effect, followed by termination of the program.

On the other hand, if the answer at step 53 is Yes (F_ABS0=1), it is determined whether or not the preceding adsorption performance degradation flag F_ABS0 is "1" (step 55). If the answer at step 55 is No, i.e., determining in the preceding adsorption performance sensing processing that the adsorption performance of the HC adsorbent 16 has not been degraded, but determining only in the current adsorption performance sensing processing that the adsorption performance of the HC adsorbent 16 has been degraded, a recovery request flag F_REC is set to "1" (step 56) on the assumption that the degraded adsorption performance is merely temporary due to attachment of oil, soot and the like on the HC adsorbent 16, so that the adsorption performance can be restored and therefore a recovery control, later described, should be conducted for achieving the recovery, followed by termination of the program.

On the other hand, if the answer at step 55 is Yes, i.e., determining both in the preceding and current adsorption performance sensing processing that the adsorption performance of the HC adsorbent 16 has been degraded, the HC adsorbent 16 is eventually determined to be degraded on the assumption that the adsorption performance of the HC adsorbent 16 will not be restored in spite of the recovery control conducted therefor, and the adsorbent deterioration flag F_ABSF is set to "1" for indicating to that effect (step 57), followed by termination of the program.

In the foregoing manner, when degraded adsorption performance of the HC adsorbent 16 is sensed once, the recovery control is first conducted, so that the adsorbent performance can be restored if the degraded adsorption performance of the HC adsorbent 16 is temporary due to attachment of soot and the like thereon. In addition, since a deterioration of the HC adsorbent 16 is considered as definite only when the degraded adsorption performance of the HC adsorbent 16 is sensed before and after the recovery control, it is possible to appropriately determine that the HC adsorbent 16 has been deteriorated only when the adsorption performance cannot be restored by the recovery control.

Figure 8:
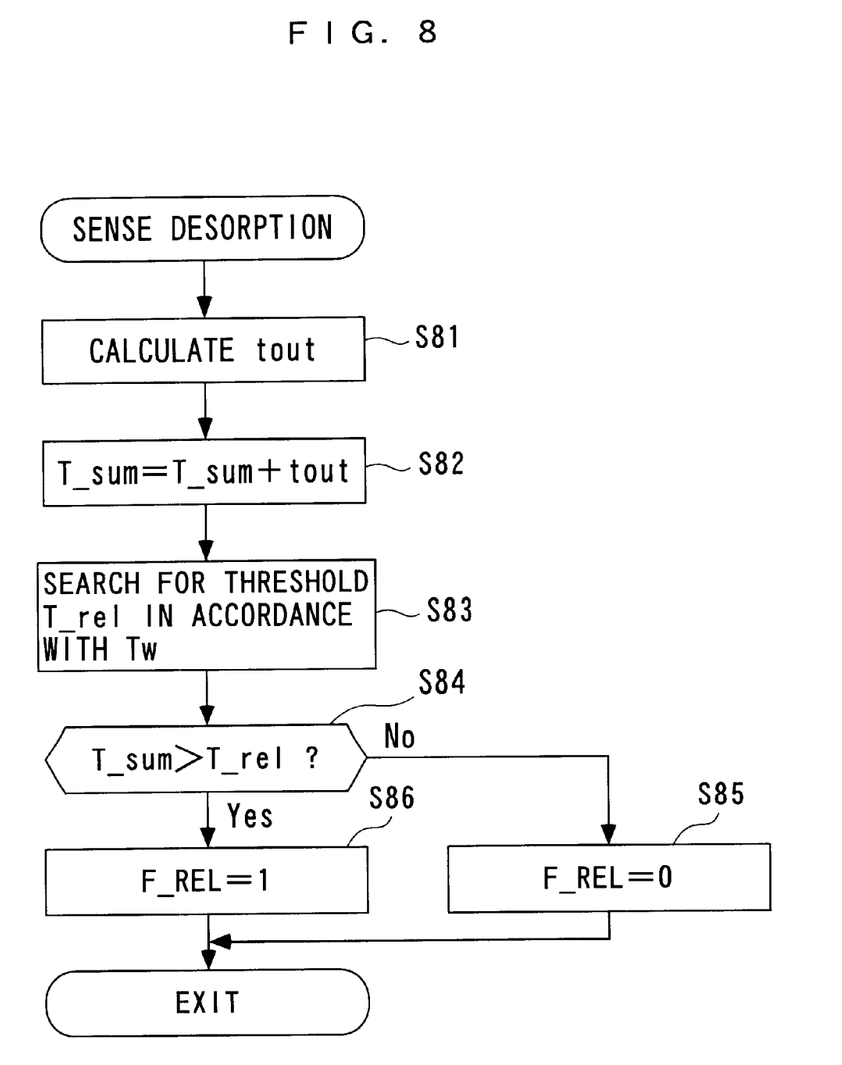
FIG. 8 is a flow chart illustrating a subroutine for desorption sensing processing for the HC adsorbent.

If the answer at step 51 is Yes, i.e., when the HC adsorbent 16 has not completed desorption during the preceding engine operation or if the HC adsorbent 16 is not currently in operation, the program proceeds to step 58, where the ECU 25 executes desorption sensing processing for the HC adsorbent 16. FIG. 8 illustrates a subroutine for the desorption sensing processing which is executed in synchronism with the generation of a TDC signal.

This processing first calculates a fuel injection time Tout by summing fuel injection times for all cylinders of the engine 1 (step 81). This fuel injection time Tout is used as a parameter for indicating the flow rate of exhaust gases. Next, the currently calculated fuel injection time Tout is added to an injection time integrated value T_sum up to the preceding time to derive a current injection time integrated value T_sum (step 82). The injection time integrated value T_sum is reset to a value "0" when an ignition switch is turned on, so that it is equal to a total sum of the fuel injection time Tout of the engine 1 from the start, thus representing the total amount of exhaust gases from the start.

Figure 9:
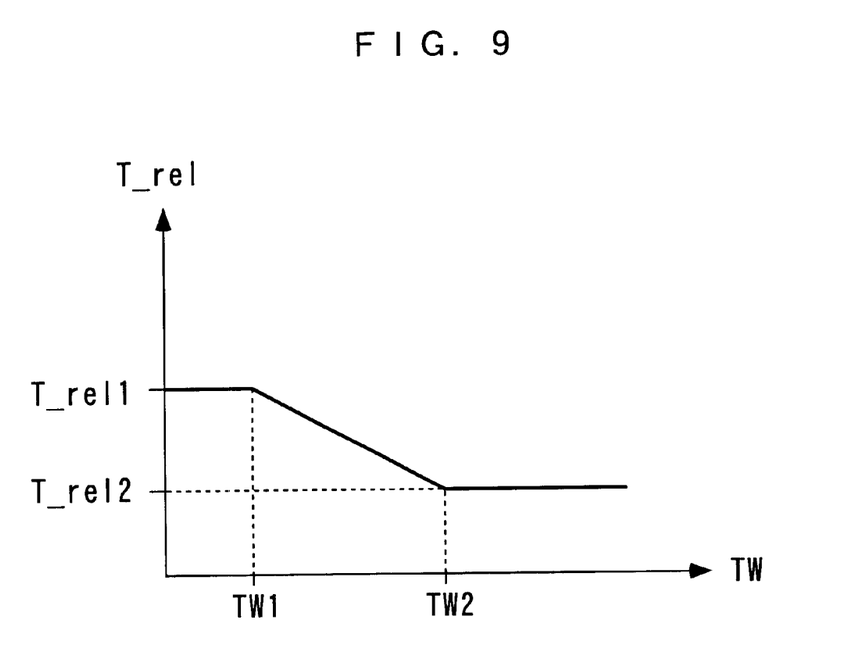
FIG. 9 shows an exemplary T_rel table used in the subroutine of FIG. 8.

Next, the subroutine proceeds to step 83, where the ECU 25 searches a T_rel table for a threshold T_rel in accordance with an engine water temperature TW at the start of the engine 1. FIG. 9 shows an exemplary T_rel table, where the threshold T_rel is set to a first predetermined value T_rel1 (for example, 300 seconds) when the engine water temperature TW is at a low level equal to or lower than a first lattice point TW1 (for example, 10° C.); se to a second predetermined value T_rel2 (for example, 250 seconds) smaller than the first predetermined value T_rel1 when the TW value is at a high level equal to or higher than a second lattice point TW2 (for example, 30° C.); and is calculated through interpolation when the TW value is between the first and second lattice points TW1, TW2. The threshold T_rel is set to a smaller value when the engine water temperature TW is high in this way because the HC adsorbent 16 requires a shorter time for desorption as the engine temperature is higher.

Next, it is determined whether or not the injection time integrated value T_sum calculated at step 82 is larger than the threshold T_rel set at step 83 (step 84). If the answer at step 84 is No, i.e., when T_sum≦T_rel, it is determined that the HC adsorbent 16 has not completed the desorption on the assumption that the amount of exhaust gases required to allow the HC adsorbent 16 to complete the desorption is not flowing through the HC adsorbent 16, and the desorption complete flag F_REL is set to "0" (step 85). On the other hand, if the answer at step 84 is Yes, i.e., when the injection time integrated value T_sum exceeds the threshold T_rel, it is determined that the HC adsorbent 16 has completed the desorption, and the desorption complete flag F_REL is set to "1" for indicating to that effect (step 86), followed by termination of the subroutine. The foregoing control permits the determination as to completed desorption of the HC adsorbent 16 to be simply and appropriately made based on the injection time integrated time T_sum. While in the foregoing example, the threshold $T_{13}$ rel is set in accordance with the engine water temperature TW at the start of the engine 1, any other appropriate parameter may be employed instead. For example, when the vehicle speed is higher, the HC adsorbent 16 is more likely to be cooled down and therefore requires a longer time for the desorption, so that the vehicle speed may be employed as the parameter to set the threshold $T_{13}$ rel to a larger value as the vehicle speed is higher.

Turning back to FIG. 5, at step 59 following the desorption sensing processing, it is determined whether or not the desorption complete flag F_REL and the recovery request flag F_REC are both at "1." If the answer at step 59 is No, the program is terminated without further processing. On the other hand, if the answer at step 59 is Yes, i.e., when it is determined that the HC adsorbent 16 has completed the desorption in the desorption sensing processing and the recovery control has been requested through the execution of step 56, the program proceeds to step 60 to execute the recovery control processing for the HC adsorbent 16 for restoring the adsorption performance of the HC adsorbent 16.

Figure 10:
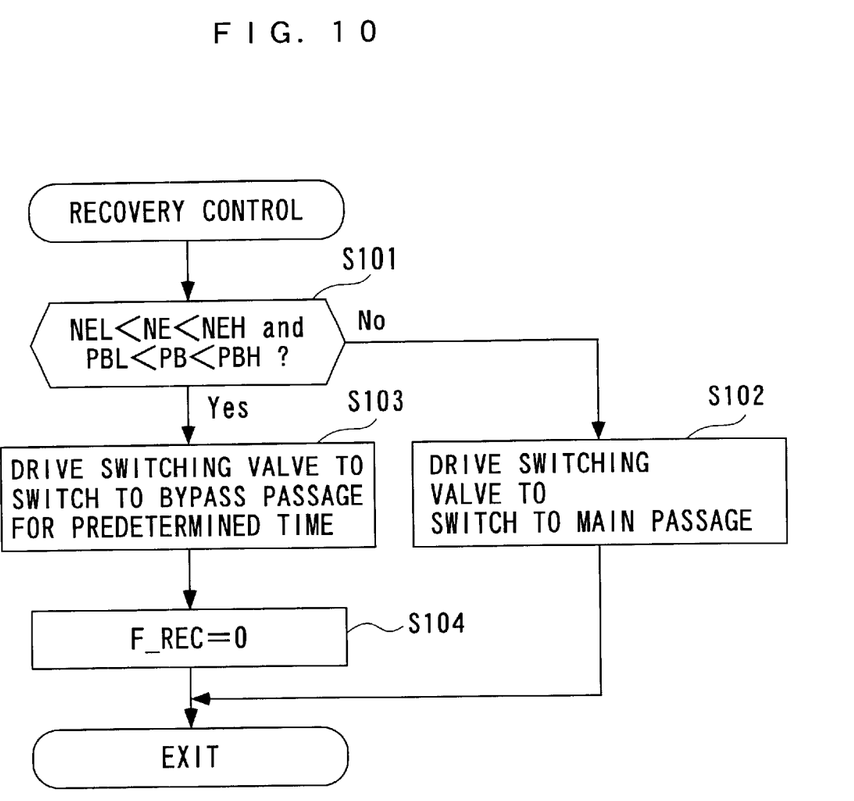
FIG. 10 is a flow chart illustrating a subroutine for recovery control processing for the HC adsorbent.

FIG. 10 illustrates a subroutine for the recovery control processing. In this processing, it is first determined whether or not an engine rotational speed NE and an intake pipe inner pressure PB are between their respective lower limit values and upper limit values, i.e., between NEL and NEH and between PBL and PBH, respectively (step 101). If the answer at step 101 is No, the switching valve 15 is driven to switch to the main passage 13 on the assumption that the engine 1 is not in an operating condition suitable for the recovery (step 102), followed by termination of the subroutine without executing the recovery operation.

On the other hand, if the answer at step 102 is Yes, i.e., when NEL<NE<NEH and PBL<PB<PHB, the switching valve 15 is driven to switch to the bypass passage 14 for a predetermined time (step 103) to execute the recovery operation. Next, the recovery request flag F_REL is reset to "0" to indicate that the recovery operation is completed (step 104), followed by termination of the subroutine. This recovery operation introduces exhaust gases into the HC adsorbent 16 to remove soot, oil and the like adsorbed on the HC adsorbent 16. Therefore, if the degraded adsorption performance of the HC adsorbent 16 is temporary due to the adsorption of such soot and the like, this recovery operation can restore the adsorption performance to restore the HC adsorbent 16. Also, since the recovery operation is executed after the completion of desorption, it is possible to securely prevent the emission of hydrocarbons to the atmosphere, which would otherwise be accompanied by the execution of the recovery operation.

While in the foregoing example, the recovery operation is performed by switching the switching valve 15 to the bypass passage 14, other appropriate methods may be employed instead, for example, a method of heating the HC adsorbent 16 with a heater, a method of increasing the temperature of exhaust gases by controlling an ignition timing, a method of increasing exhaust gases by controlling the amount of intake air, or a method of increasing the amount of supplied oxygen by supplying exhaust secondary air. Further, since the engine rotational speed NE and the intake pipe inner pressure PB at step 101 are parameters for determining whether or not the engine is in an operating condition suitable for the recovery operation, other appropriate parameters may be used instead.

As described above, according to the foregoing embodiment the estimated downstream temperature TexR_hat, which should be detected on the downstream side when the HC adsorbent 16 is normal, is calculated in accordance with the detected upstream temperature TexF and the engine water temperature TW at the start of the engine, and the estimated downstream temperature TexR_hat is compared with the actually detected downstream temperature TexR during adsorption, thereby making it possible to appropriately determine the adsorption state of the HC adsorbent 16 including the adsorption performance thereof, while reflecting the operating state of the engine 1. Also, since determination is made as to whether the HC adsorbent 16 has completed desorption based on the injection time integrated value T_sum, the determination on the completion of desorption can be simply and appropriately made while reflecting the flow rate of exhaust gases during the desorption.

Further, when it is determined that the adsorption performance of the HC adsorbent 16 has been degraded, the recovery control is conducted for restoring the adsorption performance of the HC adsorbent 16, so that the HC adsorbent 16 can be recovered by the recovery control when the degraded adsorption performance is caused by attachment of soot, oil and the like on the HC adsorbent 16 and can therefore be restored. In addition, since a deterioration of the HC adsorbent 16 is determined as definite only when degraded adsorption performance of the HC adsorbent 16 is sensed both before and after the recovery control, it is possible to appropriately determine that the HC adsorbent 16 has been deteriorated only when the adsorption performance cannot be restored by the recovery control.

It should be understood that the present invention is not limited to the foregoing embodiment but may be implemented in a variety of manners. For example, while the foregoing embodiment comprises the upstream and downstream temperature sensors 22A, 22B arranged within the bypass passage 14, more specifically, outside the HC adsorbent 16, the temperature sensors may be arranged at locations upstream and downstream of the HC adsorbent 16, i.e., inside the HC adsorbent 16. Also, while the engine water temperature TW is used as a parameter for representing the operating state of the engine 1 for calculating the estimated downstream temperature TexR_hat, any other appropriate parameter representative of the operating state may be employed instead of or in addition to the engine water temperature TW. Otherwise, the present invention may be modified in its detailed configuration as appropriate within the spirit and scope of the invention as defined by the appended claims.

As described above in detail, the adsorbent state determining apparatus of the present invention can advantageously determine the state of the adsorbent including a deterioration in a high accuracy, and recover the adsorbent if its adsorbent performance can be restored.

What is claimed is:

1. An adsorbent state determining apparatus for determining a state of an adsorbent arranged in an exhaust system of an internal combustion engine for adsorbing hydrocarbons within exhaust gases, said apparatus comprising:

an upstream temperature sensor and a downstream temperature sensor positioned at locations upstream and downstream of said adsorbent in said exhaust system for detecting temperatures of exhaust gases upstream and downstream of said adsorbent, respectively;

operating state detecting means for detecting an operating state of said internal combustion engine;

downstream temperature estimating means for estimating the temperature of exhaust gases which should be detected at the location downstream of said adsorbent during adsorption of said adsorbent based on a detected upstream temperature detected by said upstream temperature sensor and the operating state of said internal combustion engine detected by said operating state detecting means; and adsorption state determining means for determining an adsorption state of said adsorbent by comparing the estimated downstream temperature estimated by said downstream temperature estimating means with the detected downstream temperature detected by said downstream temperature sensor during the adsorption of said adsorbent.

2. An adsorption state determining apparatus according to claim 1, further comprising:

response delay compensating means for compensating at least one of said upstream temperature sensor and said downstream temperature sensor for a response delay.

3. An adsorption state determining apparatus according to claim 1, wherein said adsorbent is configured to desorb hydrocarbons once adsorbed thereby, said adsorption state determining apparatus further comprising:

desorption state determining means for determining a desorption state of said adsorbent; and desorption state storing means for storing the desorption state of said adsorbent determined by said desorption state determining means, wherein said adsorption state determining means determines adsorption performance of said adsorbent in accordance with the desorption state stored in said desorption state storing means in a preceding operation of said internal combustion engine.

4. An adsorbent state determining apparatus according to claim 3, wherein said exhaust system includes a main passage, a bypass passage circumventing said main passage and having said adsorbent arranged therein, and switching means for switching an exhaust passage to said main passage and to said bypass passage, wherein said exhaust passage is switched to said bypass passage by said switching means at a start of said internal combustion engine to adsorb hydrocarbons within exhaust gases on said adsorbent, and subsequently said exhaust passage is switched to said main passage by said switching means to desorb the hydrocarbons adsorbed on said adsorbent by exhaust gases.

5. An adsorbent state determining apparatus according to claim 4, further comprising:

exhaust gas flow rate parameter detecting means for detecting a parameter representative of a flow rate of exhaust gases, wherein said desorption state determining means determines completed desorption of hydrocarbons from said adsorbent in accordance with the exhaust gas flow rate parameter detected by said exhaust gas flow rate parameter detecting means during desorption of said adsorbent.

6. An adsorbent state determining apparatus according to claim 5, further comprising:

recovery control means for conducting a recovery control for restoring the adsorption performance of said adsorbent when said adsorption state determining means determines that the adsorption performance of said adsorbent has been degraded and when said desorption state determining means determines that said adsorbent has completed desorption.

7. An adsorbent state determining apparatus according to claim 6, wherein said adsorption state determining means again determines the adsorption performance of said adsorbent after said recovery control has been conducted to determine a deterioration of said adsorbent in accordance with the result of determination.

* * * * *